June 3, 1930. H. R. WILSON ET AL 1,761,859
MANDREL
Filed Jan. 14, 1928
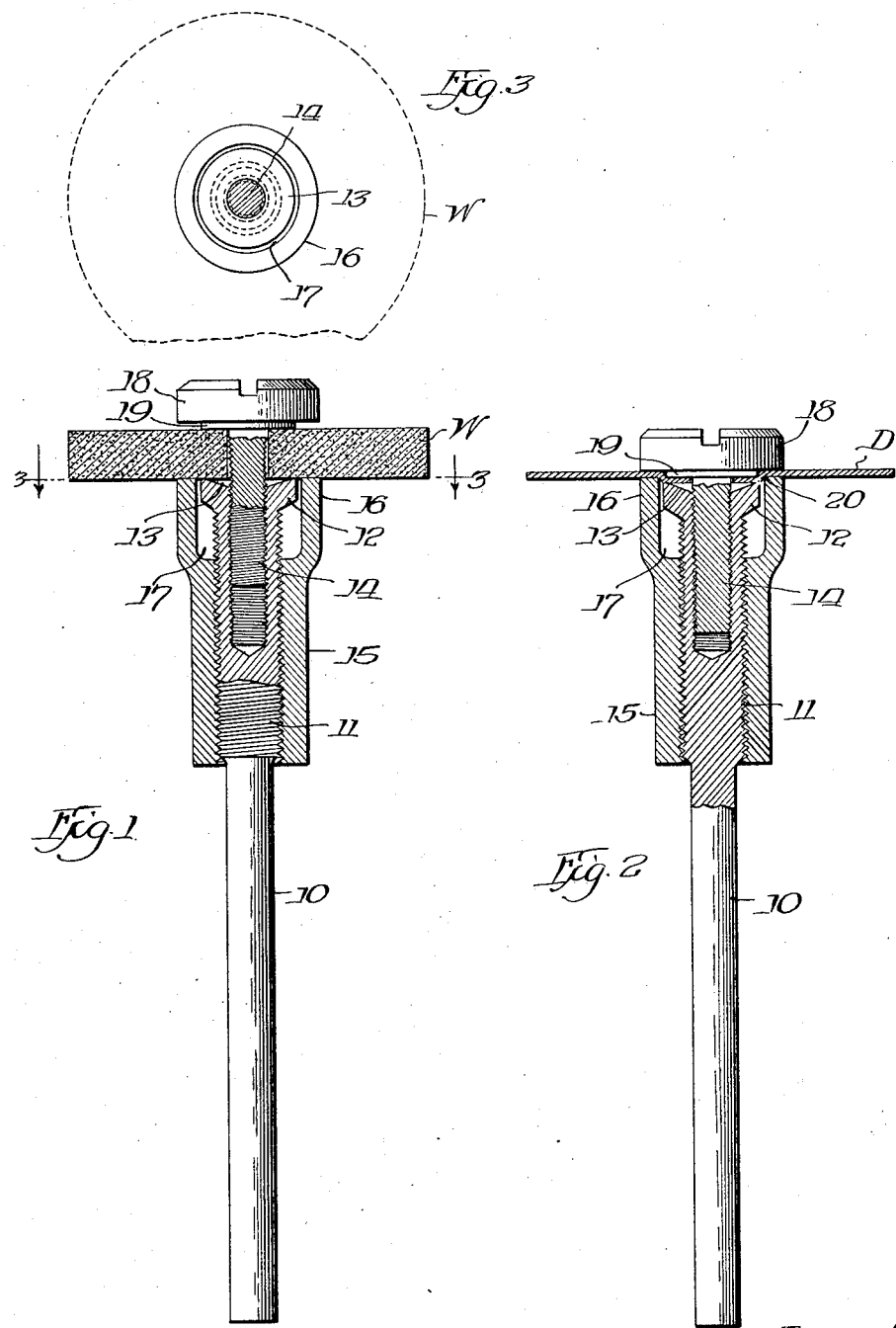

Patented June 3, 1930

1,761,859

UNITED STATES PATENT OFFICE

HOWARD R. WILSON, OF CARNEGIE, PENNSYLVANIA, AND WALLACE W. SMITH, OF CHICAGO, ILLINOIS

MANDREL

Application filed January 14, 1928. Serial No. 246,818.

Our invention relates to mandrels and has for its object the provision of means by which a lock nut on the spindle of the mandrel will prevent a wheel carried by the mandrel from being released by strain applied to the wheel. While this device has other uses, it is designed particularly for supporting and holding the grinding and polishing wheels used by dentists.

The accompanying drawings represent a dentist's mandrel drawn to a scale four times the actual size for the sake of clearness, and in said drawings Fig. 1 is an elevation, partly in section, of a mandrel supporting a grinding wheel;

Fig. 2 is a similar view with a paper disk supported in position; and

Fig. 3 is a section on line 3—3 of Fig. 1.

The shank 10 is adapted to be secured to the flexible shaft of a dental engine in the ordinary manner. The outer portion is enlarged and screw threaded as shown at 11. The extreme end is provided with a head 12 having its outer face countersunk as shown at 13. This end of the spindle of the mandrel is drilled and tapped axially for the reception of the screw 14.

The threaded enlargement 11 is made rather long, and on it is a nut 15 having its outer end enlarged at 16 and countersunk as shown at 17 to receive the head 12 of the spindle. The head 18 of the screw 14 has a slight shoulder 19 on the inner face. The diameter of this shoulder is less than the diameter of the countersink 17, and preferably of about the same diameter as head 12.

The pitch of the threads on screw 14 is slightly less than the pitch of the threads on the enlargement 11, and both have their pitches in the same direction. That is, both screws have right hand threads, or both may have left hand threads, but one cannot have right hand and the other left hand.

In placing a wheel W on the mandrel, the nut is backed up until the head 12 projects beyond the face of it. The screw 14 is then applied to clamp and hold the wheel in the ordinary manner. With this accomplished, the lock nut 15 is screwed up against the rear face of the wheel.

When the wheel is used in grinding, if the resistance is in the direction to tighten the screw 14, then any turning of the screw would result in clamping the wheel more tightly against the head 12 of the driving shank 10.

If the resistance is in the direction to loosen the screw, then we have the condition that the nut 15 is screwed against the rear face of the wheel after the screw 14 was screwed home. Under these conditions the main clamping action is betwen the shoulder 19 and the face of the nut 15. But the bearing face of the nut is of larger diameter than the face of the shoulder 19 against the wheel. As a consequence there is a greater turning friction on the nut than on the screw. But the thread of the nut is of coarser pitch than the thread of the screw 14. The result is that if there is any turning action, it will be that of the nut to increase the degree of clamping between nut and screw.

Briefly, if the action is to tighten the screw 14, then the screw cannot become loose and let the wheel fly off. If the turning action is one which would normally loosen the screw, then the superior diameter of the nut and its coarser thread act to clamp the wheel, nut and screw together, and the wheel cannot fly off.

We may look at this matter in another way. The combination consists of four parts, the spindle, the screw, the nut and the part held in place, which in this case is the wheel W. The part held, here enters into the combination because it affects the relationship of the screw and nut with respect to each other. The clamped condition can be released by turning either the screw or the nut with respect to the other three parts, but no release can be had by attempting to turn the wheel and spindle with respect to each other without first releasing either the screw or the nut.

In Fig. 2 we have shown a paper polishing wheel D held in place. Here, as before, the wheel is clamped in the ordinary manner between the screw and the head 12, and then the nut is screwed up against the rear face of the disk D. In this operation the disk is given a crimp at the point 20, but is held flat between the face of the nut and the annular surface around the shoulder 19.

What we claim is:

1. Means for clamping together two parts such as a spindle and a wheel, which means consists of a screw passing thru the wheel and screwed into the spindle and a nut screwed upon the spindle and pressing against the wheel, the bearing surface of the nut against the surface of the wheel being of greater radius than the bearing of the screw against said wheel, and the thread of the nut being in the same direction and of a coarser pitch than the thread of the screw.

2. In a device of the class described, a spindle; a screw serving to clamp a body to said spindle, and a nut screw-threaded in the same direction upon said spindle and engaging the body on the side opposite to that engaged by said screw, the diameter of the engagement of the nut upon the body being greater than the diameter of the engagement by the screw, and the pitch of the thread of the nut being greater than the pitch of the thread of the screw.

3. In a dental mandrel; a spindle, a screw arranged to clamp a wheel to the end of the spindle, and a nut screw-threaded in the same direction upon the spindle with a coarser pitch than the pitch of the screw and contacting the wheel at a larger radius than the wheel is contacted by said screw.

4. The combination with a spindle and a screw arranged to secure a wheel to the spindle; of a lock nut of coarser pitch mounted on the spindle and engaging the wheel on the side opposite to the engagement by the screw the threads of the screw and nut being of the same direction.

5. In a device of the class described, a spindle having a bearing surface against which a wheel is to be held by frictional contact, screw threaded means engaging the wheel to clamp it against said bearing surface, and a nut screwed in the same direction upon said spindle and having an annular bearing against the wheel around said spindle-bearing surface and of greater frictional diameter against the wheel than is the frictional diameter of said screw threaded means, the pitch of the thread of the nut being greater than the pitch of the thread of the screw threaded means.

HOWARD R. WILSON.
WALLACE W. SMITH.